United States Patent
Darbey

(10) Patent No.: US 11,361,032 B2
(45) Date of Patent: Jun. 14, 2022

(54) COMPUTER DRIVEN QUESTION IDENTIFICATION AND UNDERSTANDING WITHIN A COMMERCIAL TENDER DOCUMENT FOR AUTOMATED BID PROCESSING FOR RAPID BID SUBMISSION AND WIN RATE ENHANCEMENT

(71) Applicant: Bidify Ltd., Buckinghamshire (GB)

(72) Inventor: Jonathan Darbey, Buckinghamshire (GB)

(73) Assignee: Responsify Ltd., Marlow (GB)

( * ) Notice: Subject to any disclaimer, the term of this patent is extended or adjusted under 35 U.S.C. 154(b) by 231 days.

(21) Appl. No.: 16/699,471

(22) Filed: Nov. 29, 2019

(65) Prior Publication Data

US 2021/0165835 A1    Jun. 3, 2021

(51) Int. Cl.

| | |
|---|---|
| *G06F 16/906* | (2019.01) |
| *G06Q 50/18* | (2012.01) |
| *G06F 16/93* | (2019.01) |
| *G06F 16/35* | (2019.01) |
| *G06Q 10/10* | (2012.01) |

(52) U.S. Cl.
CPC ............ *G06F 16/93* (2019.01); *G06F 16/35* (2019.01); *G06F 16/906* (2019.01); *G06Q 10/10* (2013.01); *G06Q 50/188* (2013.01)

(58) Field of Classification Search
CPC ........ G06F 16/93; G06F 16/906; G06F 16/35; G06Q 10/10; G06Q 50/188
See application file for complete search history.

(56) References Cited

U.S. PATENT DOCUMENTS

| | | |
|---|---|---|
| 2013/0103690 A1 | 4/2013 | Arnold et al. |
| 2017/0132313 A1* | 5/2017 | Kukla ................. G06F 16/338 |
| 2018/0060780 A1 | 3/2018 | Kilmartin et al. |

(Continued)

OTHER PUBLICATIONS

Moydell, Top 20 RFP Questions to Include When Evaluating Third-Party Oracle and SAP Software Support May 7, 2019, Spinnaker Support, https://www.spinnakersupport.com/blog/2019/05/07/top-20-questions-to-include-rfp-when-evaluating-third-party-oracle-and-sap-software-support/.*

(Continued)

*Primary Examiner* — Jay A Morrison
(74) *Attorney, Agent, or Firm* — CRGO Global; Steven M. Greenberg

(57) ABSTRACT

In a method for computer driven question identification and understanding within a commercial tender document (CTD), different CTDs from different individuals are uploaded into fixed storage of a computer. Then, different ones of the CTDs are loaded into memory and clustered into different clusters according to at least one clustering criteria. For each one of the CTDs, a corresponding one of the clusters is identified, and a segmentation model selected for the identified one of the clusters. Thereafter, segmentation is performed upon the CTD utilizing the selected segmentation model to produce a set of segmented portions of the CTD. Finally, for each one of the segmented portions, a set of extraction rules mapped to the one of the segmented portions is retrieved, at least one question extracted from the one of the segmented portions utilizing the set of extraction rules and each extracted question stored in a crowd-sourced database of questions for CTDs.

20 Claims, 2 Drawing Sheets

(56) References Cited

U.S. PATENT DOCUMENTS

2018/0232443 A1    8/2018  Delgo et al.
2018/0239816 A1*   8/2018  Di Balsamo .......... G06F 16/355

OTHER PUBLICATIONS

Brownlee, 14 Different Types of Learning in Machine Learning Nov. 11, 2019, https://machinelearningmastery.com/types-of-learning-in-machine-learning/.*
Duda et al., Pattern Classification 2nd ed. 2001, Wiley & Sons, p. 517-81.*

* cited by examiner

COMPUTER DRIVEN QUESTION IDENTIFICATION AND UNDERSTANDING WITHIN A COMMERCIAL TENDER DOCUMENT FOR AUTOMATED BID PROCESSING FOR RAPID BID SUBMISSION AND WIN RATE ENHANCEMENT

BACKGROUND OF THE INVENTION

Field of the Invention

The present invention relates to the field of commercial tender processing and more particularly, to the automated processing of commercial tender documentation.

Description of the Related Art

Commercial tender documentation refers to the core set of commercial documents used in commerce for the procurement of goods or services. Standard commercial tender documentation ranges from a request for tender (RFT) or invitation to bid (ITB) when the nature of the goods or services to be procured is well understood, to a request for proposal (RFP) when the nature of the goods or services to be procured is less clear. In all cases, the essential structure of commercial tender documentation includes a set of questions, required to be answered by a prospective respondent. In some instances, the questions are organized in a structurally sensible manner. But, in other instances, the questions lack sufficient organization.

The process of responding to a commercial tender involves identifying each question within a commercial tender document, and formulating a written response. The written response, then, may be compared to other written responses so that the requestor may award one of the respondents with a resulting procurement contract, or so that the requestor may offer one or more of the respondents with a follow-on tender request such as a request for information (RFI) or request for quotation (RFQ). In either circumstance, the exercise of responding to a commercial tender tends to be a manual exercise that repeats itself for each commercial tender.

Recognizing the repetitive nature of responding to a commercial tender, software providers in the past have proposed automated and semi-automated tools facilitating the generation of a response to a commercial tender. Typical solutions focus on the RFP response process and rely upon a centralized repository of corporate information from which standardized answers to RFP questions may be selected and inserted into a templated response to an RFP, either manually, automatically, or in most cases, a combination of both. Some of solutions permit the tagging of answers with meta-data to facilitate the organization of pre-constructed answer content, readily accessible by the end user. In fact, some solutions go so far as to classify the recency or freshness of answer content so as to ensure the use of the most recent answer content in a response to an RFP.

However, in all instances, RFP response management solutions focus only on a repository of past used answers to questions without regard to the context of the questions asked and more specifically, the context of the RFP itself. Plainly, the best supplied answer to a question depends upon the context of the RFP. But, modern automated RFP solutions do not account for the context of the RFP. As well, while sets of questions of an RFP may appear to be different, resulting in an automated solution providing an answer mapping to the specific question presented, many questions may be semantically identical despite the use of different words. In this instance, a wide range of otherwise viable answers will be excluded from use in selecting an appropriate answer. Finally, while modern RFP response management tools select answers presented from past responses to RFPs, no consideration is provided as to the individual likelihood of success for each answer selected.

BRIEF SUMMARY OF THE INVENTION

Embodiments of the present invention address deficiencies of the art in respect to the automated generation of a response document for a commercial tender document (CTD) and provide a novel and non-obvious method, system and computer program product for computer driven question identification and understanding within a CTD. In a method for computer driven question identification and understanding within a CTD, different CTDs from different individuals are uploaded into fixed storage of a computer from over a computer communications network from different computing clients. Then, different ones of the CTDs are loaded into memory of the computer. The different CTDs may then be clustered into multiple different clusters according to at least one clustering criteria.

For each one of the CTDs, a corresponding one of the clusters is identified, and a segmentation model selected for the identified one of the clusters. For example, the segmentation model may be a template of a prototypical CTD for the industrial classification indicating different topical sections of the prototypical CTD. Thereafter, segmentation is performed upon the one of the CTDs utilizing the selected segmentation model to produce a set of segmented portions of the one of the CTDs. Finally, for each segmented portion, a set of extraction rules mapped to the segmented portion is retrieved, at least one question extracted from the segmented portion utilizing the set of extraction rules and each extracted question stored in a crowd-sourced database of questions for CTDs.

In one aspect of the embodiment, the clustering criteria is an industrial classification for a different source of each the CTDs. As well, in another aspect of the embodiment, the industrial classification is specified in machine readable meta-data included with each of the CTDs. In yet another aspect of the embodiment, the industrial classification is determined by parsing keywords of each of the CTDs and for each of the CTDs, the parsed keywords are matched to words known to correspond to a specific industrial classification. In even yet another aspect of the embodiment, the industrial classification is determined by parsing keywords of each of the CTDs and for each one of the CTDs, submitting corresponding ones of the parsed keywords to a neural network trained to correlate submitted terms with a particular industrial classification.

Finally, a further aspect of the embodiment additionally includes natural language processing each extracted question in the crowd-sourced database. The questions are then clustered in the database according to similarity based upon the natural language processing. Then, a simplest form of the clustered questions is selected as a representative one of the questions and the clustered questions are associated with the simplest form of the clustered questions. Finally, the simplest form of the clustered questions is stored in the database as the representative one of the questions for the clustered questions.

In another embodiment of the invention, a computer data processing system is configured for computer driven question identification and understanding within a CTD. The system includes a host computing system that includes one or more computers, each with memory and at least one processor. The system also includes a data store coupled to the computing system that stores therein a multiplicity of different CTDs received from over a computer communications network from different computing clients from different individuals. Finally, the system includes a question identification module. The module includes computer program instructions executing in the memory of the host computing system. The program instructions, in turn, are enabled to perform a process of computer driven question identification and understanding within a CTD.

Specifically, upon execution in the memory of the host computing system, the instructions load into the memory a multiplicity of the CTDs, and cluster the CTDs into multiple different clusters according to at least one clustering criteria. For each one of the CTDs, a corresponding one of the clusters may be identified and a segmentation model may be selected for the identified one of the clusters. Then, segmentation may be performed upon each CTD utilizing the selected segmentation model to produce a set of segmented portions of the one of the CTDs. Finally, for each one of the segmented portions, a set of extraction rules mapped to the segmented portion is received and at least one question extracted from the segmented portion utilizing the set of extraction rules. Then, each extracted question is stored in a crowd-sourced database of questions for CTDs.

In this regard, because the crowd-sourced database includes questions for CTDs sourced from different entities, trends can be identified amongst the questions. More specifically, as similar questions are grouped together under a common genus, questions of greatest interest within different CTDs processed at a moment in time can be identified as a trend of questioning. With each processed question extracted from a CTD, the question can be associated with a particular grouping and a number of questions for each grouping computed. Therefore, a distribution of received questions in the aggregate may be observed so as to reveal, computationally, questions of greatest prevalence for a given period of time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for computer driven question identification and understanding within a document such as a CTD. In accordance with an embodiment of the invention, different CTDs are received from different individuals and are then clustered into different clusters according to clustering criteria, for instance an industrial classification of a source of a corresponding one of the CTDs. Thereafter, for each CTD, a corresponding cluster is identified, and a segmentation model selected for the identified one of the clusters. Using the segmentation model segmentation is performed upon the CTD so as to produce a set of segmented portions of the CTD. Finally, for each segmented portion, a set of extraction rules mapped thereto is retrieved, at least one question extracted from the segmented portion utilizing the set of extraction rules and each extracted question is stored in a crowd-sourced database of questions for CTDs. Consequently, optimal answers can be formulated for each of the questions and automatically included in response to subsequently received CTD by matching the questions of the subsequently CTD to those in the crowd-sourced database and by supplying the optimal answers to those questions.

Figure 1:
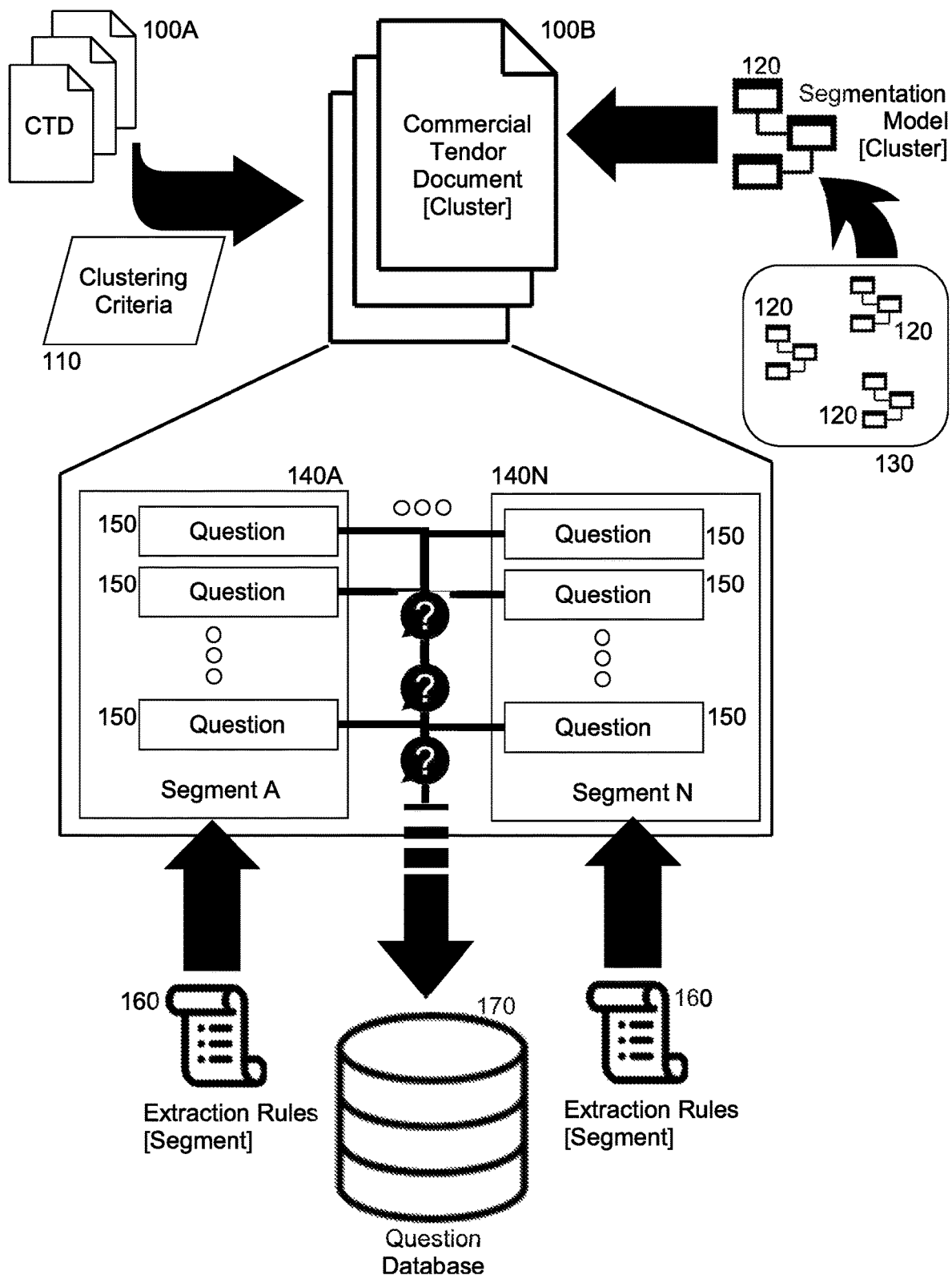
FIG. 1 is a pictorial illustration of a process for computer driven question identification and understanding within a CTD.

In further illustration, FIG. 1 pictorially shows a process for computer driven question identification and understanding within a CTD. As shown in FIG. 1, a multiplicity of different CTDs 100A, for instance RFQs, RFPs, ITBs, RFIs and the like, are received from different individuals or organizations from over a computer communications network such as the global Internet. The CTDs 100A are clustered into different clusters according to a clustering criteria, such as an associated industrial classification, geographical region, or demographic profile, to name a few examples. Once clustered, each clustered CTD 100B is then subjected to segmentation based upon the application of a segmentation model 120 in a pool 130 of segmentation modules 120, each corresponding to a different classification defined by the clustering criteria 110.

The segmentation model 120, can be a template associated with the specific classification, providing an expected architecture for the clustered CTD 100B—namely the number and type of different sections or segments 140A, 140N expected to be present in the clustered CTD 100B based upon the corresponding classification. For example, to the extent the clustered CTD 100B is classified as pertaining to building construction, the segments 140A, 140N would be specified in the selected segmentation model 120 according to material requirements, phases of construction, licensure and sub-contractors, whereas to the extent the clustered CTD 100B is classified as pertaining to health care services, the segments 140A, 140N would be specified in the selected segmentation model 120 according to health care provider biographies, hospital privileges, disease management experience, etc.

Once the clustered CTD 100B has been segmented into different segments 140A, 140N, a set of one or more extractions rules 160 are selected for each of the segments 140A, 140N. Each of the extraction rules 160 provides a directive to locating a question 150 within a corresponding one of the segments 140A, 140N. Examples include identifying text preceding specific punctuation such as a question mark or colon, or text following specific verbs indicative of a question such as "state", "provide", "list", "indicate", "explain" etc. As each question 150 is extracted from a corresponding one of the segments 140A, 140N, the question 150 is stored in a question database 170 for subsequent processing. In particular, subsequent processing may include the formulation of answers to match each of the stored questions 150, which answers may be re-used in response to any number of subsequently received CTDs 100A.

Of note, the process of question extraction may be an automated process exclusively dependent upon the extraction rules 160. As well, the process of question extraction may be a hybrid man-machine process in which different ones of the segments 140A, 140N are annotated manually by an end user through a user interface to the CTB 100B. The annotation applied to each question 150 is then associated with the structure of the question so that similar located questions 150 are assigned the same annotation. Indeed, ones of the extraction rules 160 may be inferred based upon a correlation between the terms of each annotated one of the questions 150 and the annotations themselves. Further, once an extraction rule 160 has been inferred from a human annotation of the question 150, the extraction rule 160 may be presented in the user interface for confirmation by the end user.

Optionally, the questions 150 in the database 170 may be further clustered for semantic similarity. In this regard, each of the questions 150 may be subjected to natural language processing in order to reduce each of the questions 150 to a simpler form so that sets of the questions 150 can be considered the same general question when the questions 150 in the set have the same semantic outcome from natural language processing. By clustering the questions 150 in the database 170, each answer already mapped to a genus form of a set of the questions 150 may be applied to all species questions 150 in the set without requiring a separate mapping of each answer to each species question 150 in the set.

Figure 2:
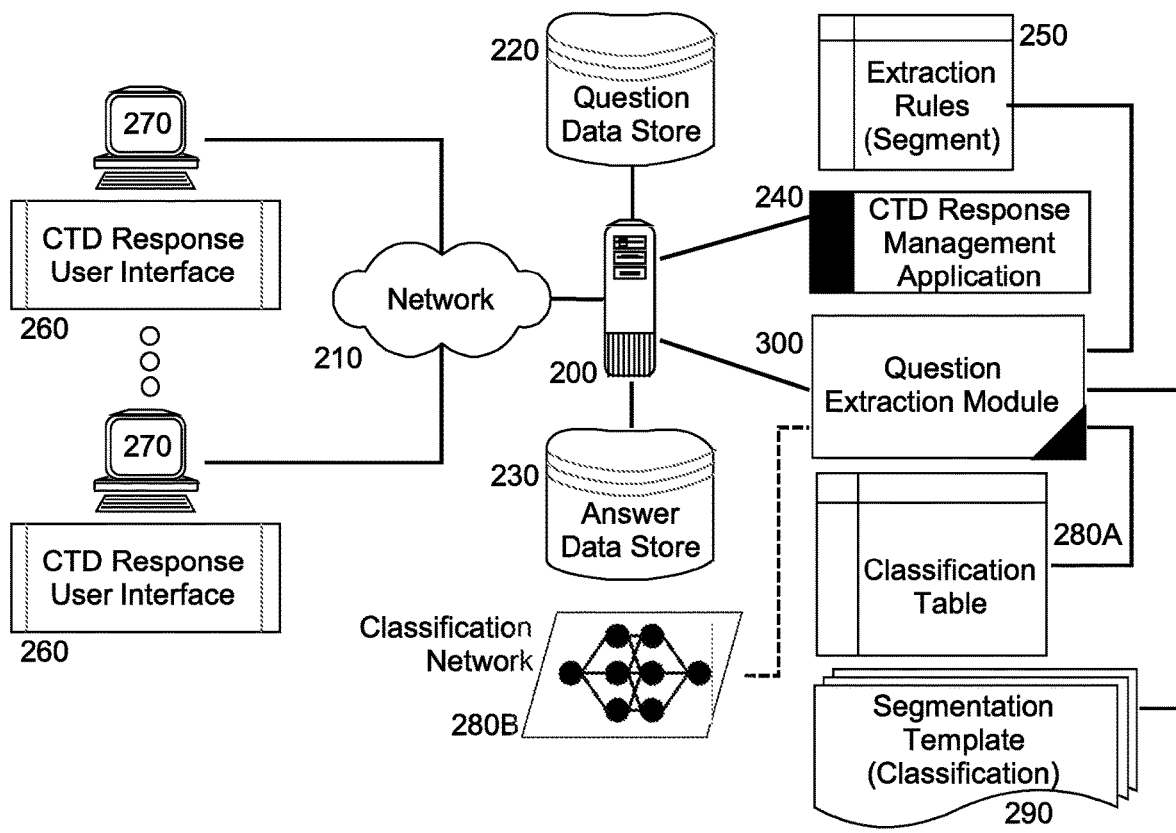
FIG. 2 is a schematic illustration of a computer data processing system adapted for computer driven question identification and understanding within a CTD; and, FIG. 3 is a flow chart illustrating a process for computer driven question identification and understanding within a CTD.

The process described in connection with FIG. 1 may be implemented within a computer data processing system. In further illustration, FIG. 2 schematically shows a computer data processing system adapted for computer driven question identification and understanding within a CTD. The system includes a host computing system 200. The host computing system 200 includes one or more computers, each with memory and at least one processor. A CTD response management application 240 executes in the memory of the host computing platform 210 and provides automated management of the generation of response documents to different CTDs. Different end users access the CTD response management application 240 from over computer communications network 210 through respectively different user interfaces 260 provided in respectively different client computing devices 260.

Of note, the CTD response management applications 240 facilitates the assembly of a response document to a particular CTD by identifying questions in the particular CTD, and mapping the identified questions similar or identical questions stored in question data store 220 and to corresponding answers stored in answer data store 230. To that end, question extraction module 300 is coupled to the CTD response management application 240. During execution in the host computing platform 200, the question extraction module 300 is configured to automate the population of the question data store 220 with questions identified amongst a multiplicity of CTDs provided by the end users through the different user interfaces 260 so as to produce a crowd-sourced database of questions within the question data store 220.

More specifically, the question extraction module 300 is defined by computer program instructions which are enabled during execution to cluster a series of CTDs received from over the computer communications network 210 by classification of each of the CTDs. Specifically, the program instructions determine the classification of each of the CTDs based upon any number of mechanisms. Those mechanisms may include extracting from each of the CTDs, meta-data denoting the classification. Other mechanisms include parsing the text of each CTD to identify different terms and comparing those terms to keywords present in a classification table 280A. A predominance of certain terms correlating to keywords of the same classification result in the CTD being assigned that classification. Finally, even yet another mechanism includes parsing the content of each CTD, filtering the content to a subset of terms in the CTD and submitting the subset of terms to a classification neural network 280A trained to correlate different sets of terms with a probability of a particular classification.

In any case, once the program instructions of the question extraction module 300 have clustered the CTDs by classification, the program instructions select a segmentation model 290 for each of the CTDs corresponding to the classification assigned to the cluster of the CTD. The program instructions then apply the segmentation model 290 selected for each corresponding one of the CTDs thereto in order to segment each of the CTDs into different segments. Finally, the program instructions, for each segment of each of the CTDs, locates in a table of extraction rules 250 a specific set of extraction rules for each segment, and applies the located extraction rules to the respective segment in order to identify and extract one or more questions for storage in the question data store 220. In this way, the question data store 220 may be populated with a crowd-sourced selection of questions which may then be processed individually or by clustered group of questions to formulate answers in the answer data store 230. Once the answers are present in the answer data store 230, the CTD response management application 240 may facilitate access to those answer, or even automatically populate a response to a contemporaneously received CTD with answers mapped to questions recognized within the contemporaneously received CTD and determined to be similar or identical to corresponding questions in the question data store 220.

Figure 3:
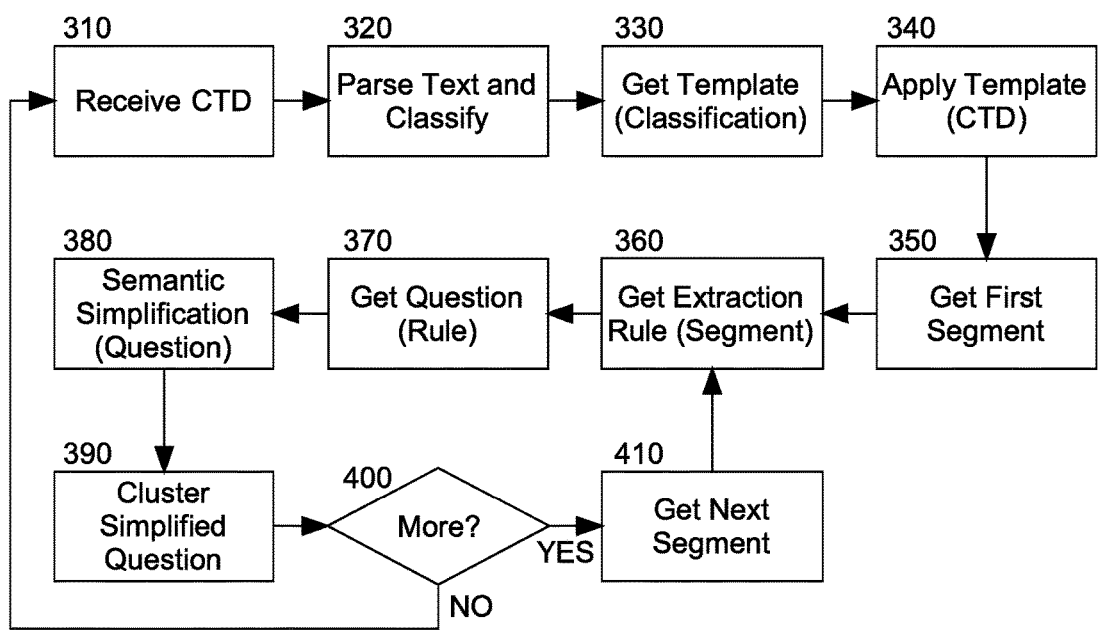

In even yet further illustration of the operation of the question extraction module 300, FIG. 3 is a flow chart illustrating a process for computer driven question identification and understanding within a CTD. Beginning in block 210, a CTD is selected for processing and in block 320, the text of the CTD is parsed and provided to a classifier to classify the CTD as belonging to a particular cluster of CTDs. Then, in block 330, a segmentation model is selected that corresponds to the classification of the cluster and the model is applied to the CTD in block 340, to segment the CTD into different segments in which different questions may be found.

In block 350, a first one of the segments is selected for processing and in block 360, an extraction rule is located for the segment from a table correlating extraction rules to segments. In block 370, the located extraction rule is applied to the text of the segment in order to extract a question. In block 380, the extracted question may be semantically simplified, for instance, through a natural language processing or part of speech identification, synonymous term identification and phrase reduction. In block 390 the simplified question is then compared to existing simplified questions in the question data store so as to determine if the extracted question is to be clustered with other similar questions belonging to the same genus of the simplified question. If so, the extracted question is clustered under the genus of the simplified question to which one or more answers already may have been mapped in the answer data store.

Finally, in decision block 400, if additional segments remain to be processed in the CTD, in block 410 a next segment in the CTD is selected for processing the process returns to block 360. Otherwise, the process returns to block 310 with the retrieval of a next CTD for processing. Of import, the foregoing process may continue for each received CTD including contemporaneously received CTDs such that the question data store constantly changes in terms of the number and nature of questions stored therein, and also the clustering of the questions into different clusters.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for computer driven question identification and understanding within a commercial tender document (CTD), the method comprising:
uploading into fixed storage of a computer from over a computer communications network from different computing clients, different CTDs from different individuals;

loading into memory of the computer, a multiplicity of the CTDs;

clustering the CTDs into multiple different clusters according to at least one clustering criteria; and, for each one of the CTDs:

identifying a corresponding one of the clusters;

selecting a text segmentation model for the identified one of the clusters from a pool of text segmentation modules, each of the textsegmentation models corresponding to a different classification defined by the clustering criteria, the text segmentation model comprising a template of a prototypical CTD for a corresponding classification of the clustering criteria and indicating different topical sections of the prototypical CTD;

performing text segmentation upon the one of the CTDs utilizing the selected text segmentation model to produce a set of segmented portions of the one of the CTDs; and, for each one of the segmented portions:

retrieving a set of extraction rules mapped to the one of the segmented portions;

extracting at least one question from the one of the segmented portions utilizing the set of extraction rules; and, storing each extracted question in a crowd-sourced database of questions for CTDs.

2. The method of claim 1, wherein the clustering criteria is an industrial classification for a different source of each the CTDs.

3. The method of claim 2, wherein the industrial classification is specified in machine readable meta-data included with each of the CTDs.

4. The method of claim 2, wherein the industrial classification is determined by parsing keywords of each of the CTDs and for each of the CTDs, matching the parsed keywords to words corresponding to a specific industrial classification in a classification table.

5. The method of claim 2, wherein the industrial classification is determined by parsing keywords of each of the CTDs and for each one of the CTDs, submitting corresponding ones of the parsed keywords to a neural network trained to correlate submitted terms with a particular industrial classification.

6. The method of claim 2, wherein the segmentation model is a template of a prototypical CTD for the industrial classification indicating different topical sections of the prototypical CTD.

7. The method of claim 1, further comprising:

natural language processing each extracted question in the crowd-sourced database;

clustering the questions in the database according to similarity based upon the natural language processing;

selecting a simplest form of the clustered questions as a representative one of the questions; and, associating the clustered questions with the simplest form of the clustered questions and storing the simplest form of the clustered questions in the database as the representative one of the questions for the clustered questions.

8. A computer data processing system configured for computer driven question identification and understanding within a commercial tender document (CTD), the system comprising:

a host computing system comprising one or more computers, each with memory and at least one processor;

a data store coupled to the computing system and storing therein a multiplicity of different CTDs received from over a computer communications network from different computing clients from different individuals; and, a question identification module comprising computer program instructions executing in the memory of the host computing system, the program instructions performing:

loading into the memory of the host computing system, a multiplicity of the CTDs;

clustering the CTDs into multiple different clusters according to at least one clustering criteria; and, for each one of the CTDs:

identifying a corresponding one of the clusters;

selecting a text segmentation model for the identified one of the clusters from a pool of segmentation modules, each of the text segmentation models corresponding to a different classification defined by the clustering criteria, the text segmentation model comprising a template of a prototypical CTD for a corresponding classification of the clustering criteria and indicating different topical sections of the prototypical CTD;

performing text segmentation upon the one of the CTDs utilizing the selected text segmentation model to produce a set of segmented portions of the one of the CTDs; and, for each one of the segmented portions:

retrieving a set of extraction rules mapped to the one of the segmented portions;

extracting at least one question from the one of the segmented portions utilizing the set of extraction rules; and, storing each extracted question in a crowd-sourced database of questions for CTDs.

9. The system of claim 8, wherein the clustering criteria is an industrial classification for a different source of each the CTDs.

10. The system of claim 9, wherein the industrial classification is specified in machine readable meta-data included with each of the CTDs.

11. The system of claim 9, wherein the industrial classification is determined by parsing keywords of each of the CTDs and for each of the CTDs, matching the parsed keywords to words corresponding to a specific industrial classification in a classification table.

12. The system of claim 9, wherein the industrial classification is determined by parsing keywords of each of the CTDs and for each one of the CTDs, submitting corresponding ones of the parsed keywords to a neural network trained to correlate submitted terms with a particular industrial classification.

13. The system of claim 9, wherein the segmentation model is a template of a prototypical CTD for the industrial classification indicating different topical sections of the prototypical CTD.

14. The system of claim 8, wherein the program instructions further perform:

natural language processing each extracted question in the crowd-sourced database;

clustering the questions in the database according to similarity based upon the natural language processing;

selecting a simplest form of the clustered questions as a representative one of the questions; and, associating the clustered questions with the simplest form of the clustered questions and storing the simplest form of the clustered questions in the database as the representative one of the questions for the clustered questions.

15. A computer program product for computer driven question identification and understanding within a commercial tender document (CTD), the computer program product including a non-transitory computer readable storage medium having program instructions embodied therewith, the program instructions executable by a device to cause the device to perform a method including:

uploading into fixed storage of a computer from over a computer communications network from different computing clients, different CTDs from different individuals;

loading into memory of the computer, a multiplicity of the CTDs;

clustering the CTDs into multiple different clusters according to at least one clustering criteria; and, for each one of the CTDs:

identifying a corresponding one of the clusters;

selecting a segmentation model for the identified one of the clusters from a pool of text segmentation modules, each of the text segmentation models corresponding to a different classification defined by the clustering criteria, the text segmentation model comprising a template of a prototypical CTD for a corresponding classification of the clustering criteria and indicating different topical sections of the prototypical CTD;

performing text segmentation upon the one of the CTDs utilizing the selected text segmentation model to produce a set of segmented portions of the one of the CTDs; and, for each one of the segmented portions:

retrieving a set of extraction rules mapped to the one of the segmented portions;

extracting at least one question from the one of the segmented portions utilizing the set of extraction rules; and, storing each extracted question in a crowd-sourced database of questions for CTDs.

16. The computer program product of claim 15, wherein the clustering criteria is an industrial classification for a different source of each the CTDs.

17. The computer program product of claim 16, wherein the industrial classification is specified in machine readable meta-data included with each of the CTDs.

18. The computer program product of claim 16, wherein the industrial classification is determined by parsing keywords of each of the CTDs and for each of the CTDs, matching the parsed keywords to words corresponding to a specific industrial classification in a classification table.

19. The computer program product of claim 16, wherein the segmentation model is a template of a prototypical CTD for the industrial classification indicating different topical sections of the prototypical CTD.

20. The computer program product of claim 15, wherein the method further comprises:

natural language processing each extracted question in the crowd-sourced database;

clustering the questions in the database according to similarity based upon the natural language processing;

selecting a simplest form of the clustered questions as a representative one of the questions; and, associating the clustered questions with the simplest form of the clustered questions and storing the simplest form of the clustered questions in the database as the representative one of the questions for the clustered questions.

* * * * *